United States Patent
Borowski

(10) Patent No.: US 12,185,702 B2
(45) Date of Patent: Jan. 7, 2025

(54) REAR LOADING SIGHTED SPEARGUN

(71) Applicant: Death From Above Spearguns LLC, Hudson, FL (US)

(72) Inventor: Mathew Borowski, Hudson, FL (US)

(73) Assignee: Death From Above Spearguns LLC, Hudson, FL (US)

( * ) Notice: Subject to any disclaimer, the term of this patent is extended or adjusted under 35 U.S.C. 154(b) by 24 days.

(21) Appl. No.: 17/584,338

(22) Filed: Jan. 25, 2022

(65) Prior Publication Data
US 2022/0248649 A1 Aug. 11, 2022

Related U.S. Application Data

(60) Provisional application No. 63/145,955, filed on Feb. 4, 2021, provisional application No. 63/141,969, filed on Jan. 26, 2021.

(51) Int. Cl.
| | | |
|---|---|---|
| A01K 81/04 | (2006.01) | |
| A01K 81/00 | (2006.01) | |
| F41B 7/04 | (2006.01) | |

(52) U.S. Cl.
CPC .............. *A01K 81/04* (2013.01); *A01K 81/00* (2013.01); *F41B 7/04* (2013.01)

(58) Field of Classification Search
CPC ........... A01K 81/04; A01K 81/00; F41B 7/04; F41B 7/043
USPC .................................................. 43/6; 124/17
See application file for complete search history.

(56) References Cited

U.S. PATENT DOCUMENTS

| | | | |
|---|---|---|---|
| 182,330 A | 9/1876 | Robinson | |
| 313,413 A | 3/1885 | Elsey | |
| 437,770 A | 10/1890 | Brandenburg | |
| 3,016,891 A | 1/1962 | Ebeling | |
| 3,090,151 A | 5/1963 | Trigg | |
| 3,340,642 A | 9/1967 | Vasiljevic | |
| 3,364,609 A | 1/1968 | Kennedy | |
| 3,585,979 A * | 6/1971 | Hendricks | F41B 7/04 124/35.1 |
| 4,100,855 A * | 7/1978 | O'Callaghan | F42C 3/00 102/371 |
| 4,894,940 A | 1/1990 | Frain | |
| 6,485,375 B1 * | 11/2002 | McKinley | A63B 60/02 473/340 |
| 6,895,950 B2 | 5/2005 | Gillet | |
| 6,953,034 B2 | 10/2005 | May | |

(Continued)

FOREIGN PATENT DOCUMENTS

| | | |
|---|---|---|
| CN | 107494475 A | 12/2017 |
| EP | 2136176 A2 | 12/2009 |

(Continued)

*Primary Examiner* — John E Simms, Jr.
(74) *Attorney, Agent, or Firm* — Griffin C. Klema

(57) ABSTRACT

A speargun and speargun components are disclosed allowing for rapid reloading of the spear, and retaining the spear in the gun with an open track and retention mechanism. A spear retention mechanism is also disclosed, which may be integral with the speargun or interchangeable for different size spears. A phospholuminescent sighting track on one or both sides of the top of the speargun is also disclosed whereby the illuminated portion of the speargun provides a visual sight for a spear once inserted into the track. An interchangeable system of speargun retention mechanisms is also provided.

17 Claims, 11 Drawing Sheets

(56) References Cited

U.S. PATENT DOCUMENTS

| | | | |
|---|---|---|---|
| 7,520,084 B2 | 4/2009 | Rogers | |
| 7,827,978 B2* | 11/2010 | Pedemonte | F41B 7/04 |
| | | | 124/20.3 |
| 9,243,864 B2 | 1/2016 | Garofalo | |
| 9,810,505 B2 | 11/2017 | Hachigian | |
| 2004/0074484 A1 | 4/2004 | Gillet | |
| 2004/0112353 A1* | 6/2004 | Stewart | G01N 3/567 |
| | | | 124/17 |
| 2007/0163558 A1 | 7/2007 | Riffe | |
| 2009/0038600 A1 | 2/2009 | Robinik | |
| 2013/0340316 A1 | 12/2013 | Gregory | |
| 2014/0096430 A1* | 4/2014 | Kruse | F41G 1/345 |
| | | | 42/144 |
| 2015/0024880 A1* | 1/2015 | Pedersen | F41B 5/148 |
| | | | 124/44.5 |
| 2017/0115090 A1* | 4/2017 | Bofill | F41B 5/123 |
| 2017/0205184 A1 | 7/2017 | Hachigian | |
| 2018/0087868 A1* | 3/2018 | Jones | F41G 11/00 |
| 2020/0278169 A1 | 9/2020 | Shaulov | |
| 2021/0029985 A1 | 2/2021 | Watson | |
| 2021/0108884 A1* | 4/2021 | Kronengold | F41C 23/14 |

FOREIGN PATENT DOCUMENTS

| | | | |
|---|---|---|---|
| EP | 3081890 A1 | 10/2016 | |
| FR | 1279319 A | 12/1961 | |
| FR | 2758878 A1 | 7/1998 | |
| FR | 2798188 A3 | 3/2001 | |
| FR | 3021399 A1 | 11/2015 | |
| GB | 925360 A | 5/1963 | |
| IT | 201800004767 A1 | 10/2019 | |
| WO | 2006134278 A1 | 12/2006 | |
| WO | WO2006134278 | * 12/2006 | F41B 7/04 |

\* cited by examiner

REAR LOADING SIGHTED SPEARGUN

CROSS-REFERENCE TO RELATED APPLICATIONS

The present application claims benefit under 35 U.S.C. Sec. 119 to U.S. provisional patent application Ser. No. 63/141,969 filed Jan. 26, 2021, and U.S. provisional patent application Ser. No. 63/145,955 filed Feb. 4, 2021. The foregoing applications are hereby incorporated by reference into the present application in their entirety.

BACKGROUND OF THE DISCLOSURE

When spearfishing, time is of the essence. Spearguns have historically been loaded by inserting the spear from the front of the gun, through the muzzle, and into a closed track rearward to the trigger mechanism. This procedure requires the user to manipulate the gun and spear in a cumbersome, time-consuming fashion before the device may be reloaded. Spearguns also may employ magnets, or line wraps to retain the spear in an open track, and rigging such setups is likewise time-consuming and often cumbersome, particularly underwater.

FIELD OF THE DISCLOSURE

The present disclosure generally relates to underwater spearfishing guns.

BACKGROUND ART

Conventional spearguns employ various mechanisms to retain a spear in the gun, including line wraps, magnets, and other means. These conventional retention mechanisms add friction or drag to the spear when released, thus reducing accuracy. Set up of line-based wraps is cumbersome underwater when reloading. Magnetic retention is ineffective to retain the spear in the gun if the spear is bumped.

While certain aspects of conventional technologies have been discussed to facilitate disclosure, Applicant in no way disclaims these technical aspects, and it is contemplated that the claimed disclosure may encompass one or more of the conventional technical aspects discussed herein.

In this specification where a document, act, or item of knowledge is referred to or discussed, that reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

BRIEF SUMMARY OF THE DISCLOSURE

The following presents a simplified summary of the disclosure in order to provide a basic understanding of some aspects of the disclosure. This summary is not an extensive overview of the disclosure. It is intended neither to identify key or critical elements of the disclosure nor to delineate the scope of the disclosure. Its sole purpose is to present some concepts of the disclosure, in accordance with the disclosure, in a simplified form as a prelude to the more detailed description presented later.

The present disclosure generally relates to spearfishing, and spearguns and their component parts in particular. More specifically, an interchangeable spear retention device is disclosed in which a spear may be loaded into a speargun from the rear, butt end, and a gun sighting device.

The retention blocks disclosed can be rapidly interchanged from the speargun, thus allowing for in-field flexibility for a user, who may use different spears for different purposes or targets. The sight disclosed allows for enhanced user target acquisition by providing a greater amount of luminous sighting material on one or both sides of a spear. The sight disclosed includes photoluminescent properties for passive sight illumination.

In one embodiment, a spear retention block is disclosed that comprises a block body with a spear-retaining cavity, and that cavity defines a central axis, while two retention jaws extend outward and away from the retaining cavity relative to the central axis, and also lengthwise longitudinally and parallel to the central axis, and on a bottom surface of the block body is a threaded portion providing for threaded height adjustment of the retention block when installed in a speargun.

In another embodiment of the disclosure a speargun sighting device is provided which includes a photoluminescent concave cylindrical arc, its inner face defining a spear track and central axis while the edges of the arc define two sighting portions. The length of the concave cylindrical arc defines a sight length. The outer portion of the concave cylindrical arc constitutes an outer profile.

In still yet a further embodiment of the disclosure, a speargun is provided which includes a stock, a photoluminescent concave cylindrical arc defining a spear track along the stock, and interchangeable speargun retention block, and a mortise within the stock dimension to accept the retention block.

Embodiments of the present disclosure may include components manufactured from various materials based upon the contemplated use. Materials that are durable, resilient to saline environments, and cleanable are contemplated to be within the scope of the present disclosure. By way of example and not limitation, materials may be stainless steel, brass, bronze, wood, epoxy resin, anodized aluminum, or acetal plastics.

BRIEF DESCRIPTION OF THE DRAWINGS

The disclosure can be readily understood by considering the following detailed description in conjunction with the accompanying drawings, in which.

DETAILED DESCRIPTION

Figure 1:
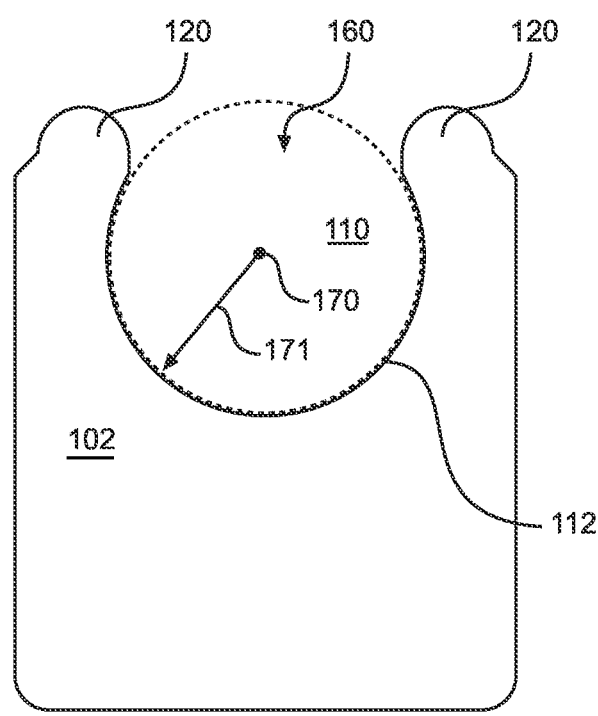
FIGS. 1, 2, and 3 illustrate side cutaway views of an embodiment of a spear retention block.

The following detailed description and the appended drawings describe and illustrate various embodiments of the disclosure solely for the purpose of enabling one of ordinary skill in the relevant art to make and use the disclosure. As such, the detailed description and illustration of these embodiments are purely exemplary in nature and are in no way intended to limit the scope of the disclosure, or its protection, in any manner. It should also be understood that the drawings are not to scale, and components within a given figure may also not be to scale with regard to one another. And in certain instances details have been omitted, which are not necessary for an understanding of the present disclosure, such as conventional details of fabrication and assembly.

In the Summary above, in the Description, and in the accompanying drawings, reference is made to particular features of the disclosure. It is to be understood that the disclosure in this specification includes all possible combinations of such particular features. For example, where a particular feature is disclosed in the context of a particular aspect or embodiment of the disclosure, or a particular claim, that feature can also be used, to the extent possible, in combination with and/or in the context of other particular aspects and embodiments of the disclosure, and in the disclosure generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

Unless otherwise specified, the terms "approximately" and "about" when used in the context of a numeric figure are defined to mean ±10% of the corresponding number(s). The term "at least" followed by a number is used herein to denote the start of a range beginning with that number (which may be a range having an upper limit or no upper limit, depending on the variable being defined). For example, "at least 1" means 1 or more than 1. When a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

While the specification will conclude with claims defining the features of embodiments of the disclosure that are regarded as novel, it is believed that the disclosure will be better understood from a consideration of the following description in conjunction with the figures, in which like reference numerals are carried forward.

One embodiment of a spear retention block, in accordance with the disclosure, may include a block body having a spear-retaining cavity, where the cavity defines a central axis, and two retention jaws extending outward and away from the retaining cavity while also longitudinally parallel to the central axis, and a threaded portion disposed on a bottom surface of the block body.

In some embodiments of a spear retention block, the retention jaws are provided of a deformable material.

With respect to the retaining cavity, some embodiments could comprise a retaining cavity which is substantially an arc whose central angle is greater than 180 degrees but less than about 247 degrees, the arc being concentric to the central axis.

Other embodiments of a retention block may include the arc of the retaining cavity having a radius which is about 0.016 inches greater than the radius of a cylindrically-shaped spear shaft.

In still yet other embodiments, the threaded portion of the retention block comprises an internally-threaded portion extending inward into the block body orthogonal to the central axis.

Some embodiments of the retention block threaded portion comprises a rotatable externally-threaded portion extending outward from the bottom surface of the block body which is also orthogonal to the central axis.

Embodiments of the retention block disclosed herein may be defined lengthwise according to the central axis, with the block length being between 0.5 inches and 2.0 inches.

The retention jaws of the retention block may, in other embodiments, define a throat between each of the two jaws, while the jaws may have a rounded profile.

Further embodiments of a spear gun retention block may include a rounded or curved portion at a front end and a rear end of the retention jaws, such that a spear gun rigging, or user objects do not become snagged on an elevated portion of the retention block while assembled into a spear gun stock.

In other embodiments contemplated within the disclosure, a spear gun sighting device is comprised of a photoluminescent concave cylindrical arc defining a central axis, such that the cylindrical arc further defines to parallel sighting portions, and further comprises a sight length, and outer profile, and an inner arc, where the inner arc defines a spear track. The spear track is provided along the top surface of a spear gun stock.

In some embodiments, the sighting portions of the sighting device are substantially level with the top surface of the spear gun stock.

In still other embodiments, the outer profile of the spear gun sighting device constitutes a second arc, concentric with the inner arc relative to the central axis.

In some embodiments of a spear gun sighting device, the sighting portions' width is between about 0.03 inches and about 1.5 inches, while the sight length is at least 3 inches.

The present disclosure also contemplates embodiments of a speargun comprising a stock, a photoluminescent concave cylindrical arc defining a spear track along the stock, and interchangeable speargun retention block, and a mortise within the stock, such that the mortise is dimensioned to reversibly accept the interchangeable speargun retention block.

In some embodiments of the speargun disclosed herein, the mortise is located rearward of a power band attachment point, and further comprises a weep hole from the bottom of the mortise through the stock, allowing water to drain out of the mortise.

In still other embodiments of the speargun, the stock may have a second mortise dimension to reversibly accept a second interchangeable speargun retention block.

In one embodiment, the interchangeable retention block includes a first threaded portion, while stock includes a second threaded portion, such that the first threaded portion and the second threaded portion are adapted to threadedly translate the retention block into the mortise while also providing relative height adjustment or displacement of the block within the mortise, by threaded translation, so that the bottom of the retention block retaining cavity may be seated just below the relative height of the spear track.

Additional embodiments may include a second retention block, the stock, the retention block, the mortise, and the second retention block defining interchangeable speargun retention system.

A speargun retention mechanism and sighting device is disclosed. A projectile spear has a pointed end and a rear trigger-engaging end, the ends defining a central axis. The spear is operatively engaged with a speargun through a track along the top length of the speargun from muzzle end, through the fore stock, fore arm, or fore grip—to a trigger mechanism, wherein the spear sits in the track with its trigger-engaging end coupled with the trigger mechanism. As used herein, the stock generally refers to that portion of a speargun from butt end through to the end from which a spear is projected outward from the gun, and more particularly may refer to only that front portion of the gun which is forward of the pistol grip or trigger mechanism, and not necessarily including the butt end (sometimes referred to in gun parlance as the buttstock or simply stock). A retention block is provided at a point along the track which reversibly retains the spear in the speargun along the track while also allowing the spear to freely accelerate forwardly along the track and out the muzzle end of the speargun. The speargun retention block serves to constrain a portion of the spear's shaft within a speargun while limiting contact with the shaft, which rests against the track both before and after the retention block. In this way, the shaft floats in the middle of the retention block when the spear is loaded into the gun, without touching the retention block. The retention block sits in a mortised portion of the speargun stock.

The interior portion of the retention block constraining the spear shaft defines a retention cavity. In one embodiment, the retention cavity is approximately circular, with its perimeter defining an arc. The arc may be greater than 180 degrees. The arc may be less than about 247 degrees. The radius of the arc in this embodiment defines a central axis. Thus, a spear inserted into the track and locked into place through the retention block is operatively retained in the speargun while also being allowed to slide co-axially with the track axis unimpeded by the block during firing. The rearward, forward, or both rearward and forward portions of the retention block jaws may include a rounded or beveled area to ensure any speargun rigging components do not snag on the retention jaws which may extend above the surface of the speargun stock, track, or sights.

The retention cavity may be defined by an irregular profile having at least three innermost points, the three points defining an inscribed circle with a radius, the radius in turn defining a central axis. Various retention cavity profiles are contemplated in the disclosure, including a circular arc, an elliptical arc, striations, undulated portions, and various combinations such that, under any configuration, a central axis is defined based on the innermost points and which in turn defines a central axis of the retention block. The areas in close approximate relation to a spear shaft retained in the retention block may be considered an interface area. The jaws may be considered of themselves one or more of the interface areas.

An alternative embodiment to a removable floating retention block is that the retention jaws may be provided integral with the speargun track itself.

In one embodiment, the gap between the shaft and the interface of the retention block is about 0.016 inches. The gap may be larger than 0.016 inches. In other embodiments, the retention cavity may be irregular while still having at least three points of contact to a spear inserted in the cavity. Those points of contact defined the central axis.

The retention block may be provided with an elevational adjustment system. In one embodiment, the elevational adjustment system may comprise an internally threaded portion in the stock of the gun adapted to threadedly engage corresponding male threaded portion on the bottom surface of the retention block. The internally threaded portion may be within a mortise of the stock dimensioned to accept the retention block. Either the internally threaded portion or the externally threaded portion may be separately threaded relative to either the stock or the retention block so that the relative height of that threaded portion projecting from the stock or the retention block may be adjusted.

By way of example and not limitation, the retention block may include a threaded fastener, while the stock may include a doubly-threaded fastener, such as a threaded insert, which includes concentrically aligned internal threads and external threads together with a means for rotating the fastener and thereby engaging the outer threads with the stock into which it is embedded. Turning the threaded insert thus adjusts the relative elevation of the fastener above the bottom of the mortise such that the retention block may be threadedly engaged with the threaded insert.

The threaded insert may be provided in the mortise at an angle relative to the central axis. In one embodiment, the threaded insert may have a 2 degree forward or rearward cant.

Other embodiments providing for one or more threaded elevational adjustment systems are contemplated within the disclosure. The threaded insert may be embedded into the retention block, while the corresponding threaded fastener may be provided on the gun stock. In this example, the relative elevation of the retention block may be adjusted by increasing or decreasing the relative height of the threaded insert to the bottom of the retention block for inserting the retention block into the mortise and engaging the threaded fastener of the stock.

In other embodiments, the elevational adjustment system may include two such sets of threaded inserts. In yet another embodiment, the retention block may itself have a permanently threaded portion while the gun stock may have a rotationally constrained fastener adapted to engage the threaded portion of the retention block, and the relative elevation of the retention block may be adjusted by rotating the constrained fastener.

The retention block includes a pair of parallel retention jaws provided above and co-axial with the central axis of the retention cavity. The parallel retention jaws define a throat between them, the throat being dimensioned narrower than the diameter of the spear. Below the retention jaws in the hollow, cylindrically-shaped interior of the retention block is a retention cavity. The retention cavity is dimensioned larger than the spear, such that the spear may slide rectillinearlly along the central axis through the retention cavity unimpeded. In one loading process, a spear is placed above the track of the speargun, sliding it through the power bands, with the rear sharkfin tab end of the spear is inserted into the trigger mechanism, and then applying sufficient radial pressure to the front of the spear above the retention block, downwardly, into the throat of the retention block so as to overcome the separation force of the retention jaws and allowing the spear shaft to displace the jaws and snap into the retention cavity, the spear thereafter being radially retained within the retention block after insertion. A second loading process, in accordance with the present disclosure, may be accomplished by loading a spear from the rear of the gun, sliding it into the track, and axially forward into and through the retention cavity until the spear lies coaxially to the track, then rearwardly bringing the spear into operative position within the trigger mechanism. For either loading method, the spear becomes constrained within the speargun by way of the combined retention of the forward-facing retention block together with the rearward trigger mechanism. Upon applying the wishbone of the power band to the shark fin of the spear, the spear then becomes operatively constrained along the track. A spear may similarly be removed with like fashion, pulling upward on the spear until a sufficient amount of pressure is applied to overcome the separation force between the retention jaws.

Suitable materials for the retention block (especially for the portion between the retention block base and the retention block parallel retainers) may include epoxy resins, Delrin®, acetyl plastics, and other polymers providing appropriate durometer or flex. A metal retention block is also contemplated wherein the neck portion of the retention mechanism provides the required flex to allow a spear to be inserted through the gap between the parallel retainers.

A number of retention blocks may be provided which have different inner apertures, dimensioned to accept different sized spear shafts while maintaining the appropriate gap between the top portion of the retention block and the shaft, as well as the bottom portion of the retention block in the shaft. In this way, a system is disclosed whereby two or more retention blocks may be interchanged within a single mortise of a speargun. A user thus may have a single speargun, multiple different diameter spears, and be able to use each of those spears with the once speargun by changing the retention block to the block that matches the desired spear.

A speargun track is provided in which photoluminescent dye is impregnated in or applied to the surface of the track. With a spear inserted into or on the photoluminescent track, a user thus sees one or two illuminated lines along the length of the track along the side of the spear, thereby facilitating aiming of the spear in the speargun at a desired target.

The speargun track inner face may constitute a circular arc, and elliptical arc, or any irregular profile such that a spear operatively engaged with the track sits snugly in the track without being constrained along the spear's shaft axis.

In some embodiments, the photoluminescent speargun track constitutes a concave cylindrical arc, wherein the interface consists of an arc, and outer face consists of a second arc, and on each edge of the track where the two arcs end constitute a sighting portion. Those sighting portions may be flat, rounded, or continuous with the shape of a spear gun stock. In this way, the inner profile of the track which transitions to the outer profile of the track defines the sighting portion which remains visible to a user when a spear is inserted into or placed on the track.

The track inner profile's central angle may be between about 90 degrees and about 190 degrees.

The photoluminescent portions of the siding track may be continuous along the full length of the track, interrupted one or more times along its length, and thereby facilitating visual orientation of the gun's muzzle end from its butt end. Varying colors of photoluminescent materials may be provided to accomplish the same objectives.

A rear-loading sighted speargun is also disclosed which includes phospholuminescent-impregnated track and interchangeable spear retention block.

The rear loading speargun may have a mortise into which variously-sized retention blocks may be inserted. The mortise is dimensioned to accept the retention block with slight gap between the inner edges of the mortise and the outer edges of the retention block, thus allowing a fluid to pass between the block and the mortise to enable flushing of the mortise while a retention block remains inserted.

A gap may further be provided between the retention block and the speargun stock mortise sides and bottom, thus facilitating drainage of water out and away from the retention block and avoiding buildup of salts, deposits, and debris between the retention block and the speargun stock.

The speargun stock may further include a weep hole in the retention block mortise through the stock to a point of exit. The exit point may be on the bottom of the stock. The weep hole may be orthogonal to the central axis, or at an angle therefrom. In one embodiment, the weep hole extends from the mortise through the stock at a slight angle rearward towards the butt of the gun.

In one embodiment, the mortise and retention block are provided closer to the muzzle-end of the gun, but rearward of the location where the power bands attach to the stock.

The speargun may include more than one mortise, and therefore more than one retention block. Multiple mortises may be provided on the stock of the gun, allowing a user to choose a desired placement of the retention block along the length of the stock.

Figure 2:
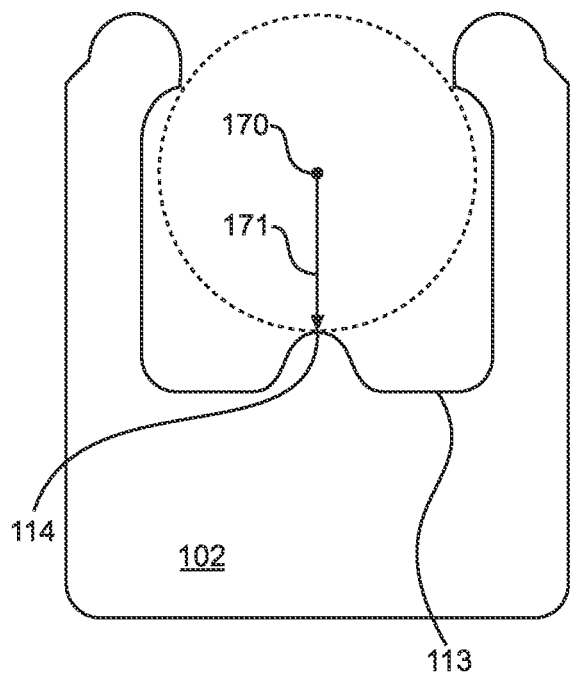
Figure 3:
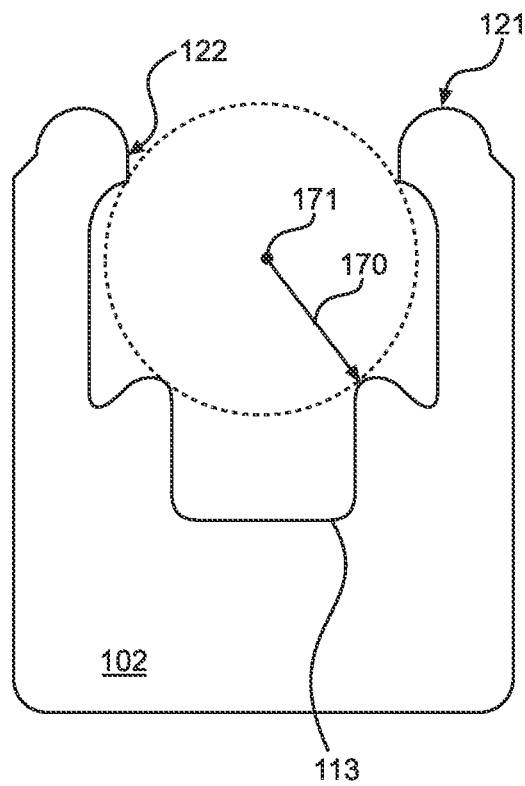

Now, with reference to FIGS. 1, 2, and 3, embodiments of a spear retention block are provided in accordance with the disclosure. Retention block 100 includes block body 102 within which retention cavity 110 is provided. The retention cavity in this embodiment includes an arc-shaped cavity profile 112 with central axis 170 and radius 171. Retention jaws 120 define throat 160. FIGS. 2 and 3 depict irregular-shaped cavity profiles 113, further including contact points 114. The retention jaws are further illustrated with rounded top portion 121 as well as rounded inner throat portion 122.

Figure 4:
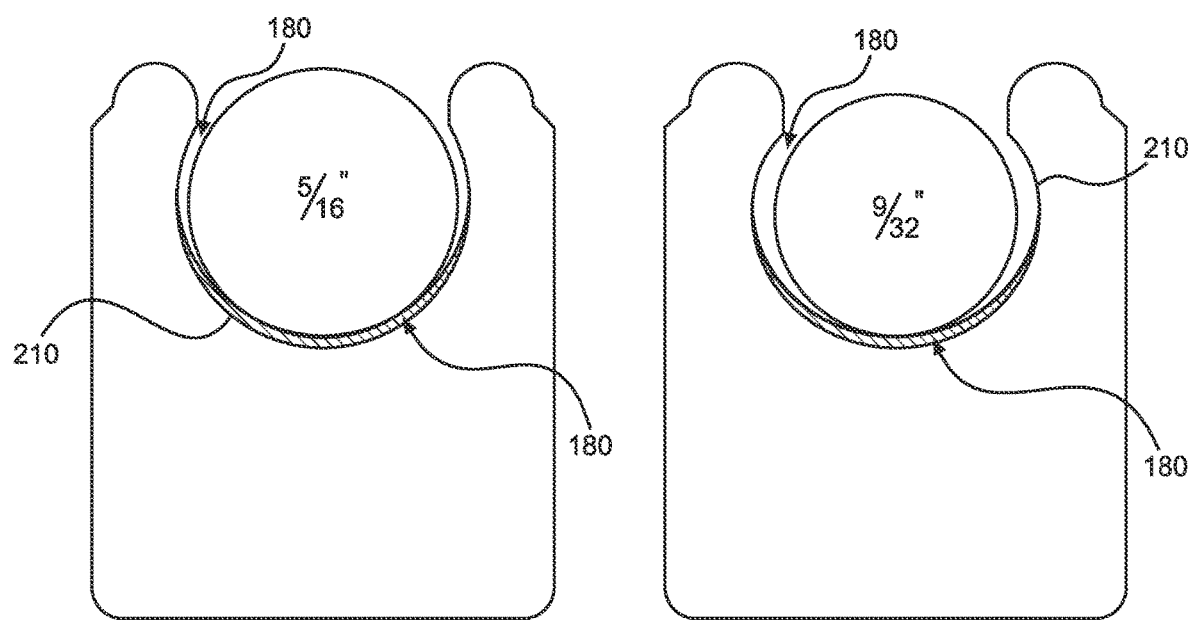
FIG. 4 illustrates a side cutaway view of an embodiment of a spear retention block showing sizing of the retention cavity relative to the diameter of a spear shaft.

FIG. 4 illustrates two retention blocks (not to scale, relative to one another) wherein the outer dimensions of the retention block are the same while the retention cavities have different cavity profiles so as to retain varying diameter spear shafts. In this figure, shafts with 9/32 inch and 5/16 inch diameter are illustrated. Each retention block retains optimal block-shaft and bock-track gaps 180, such that when a spear is inserted into a speargun track inner profile 210, the spear floats within the retention cavity, while remaining constrained to the speargun track.

Figure 5:
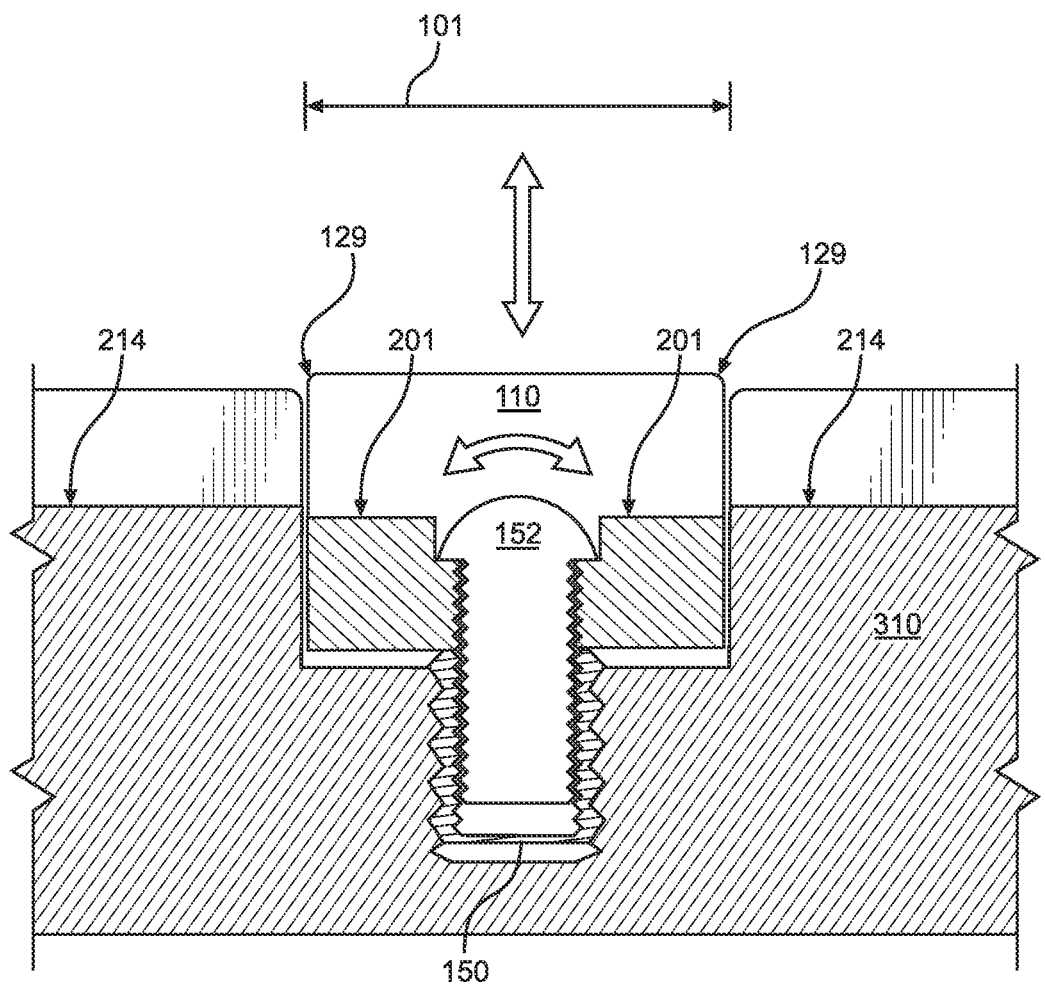
FIGS. 5, 6, and 7 illustrate side cutaway views of various embodiments of a spear retention block, operatively engaged with the mortise of a speargun.
Figure 6:
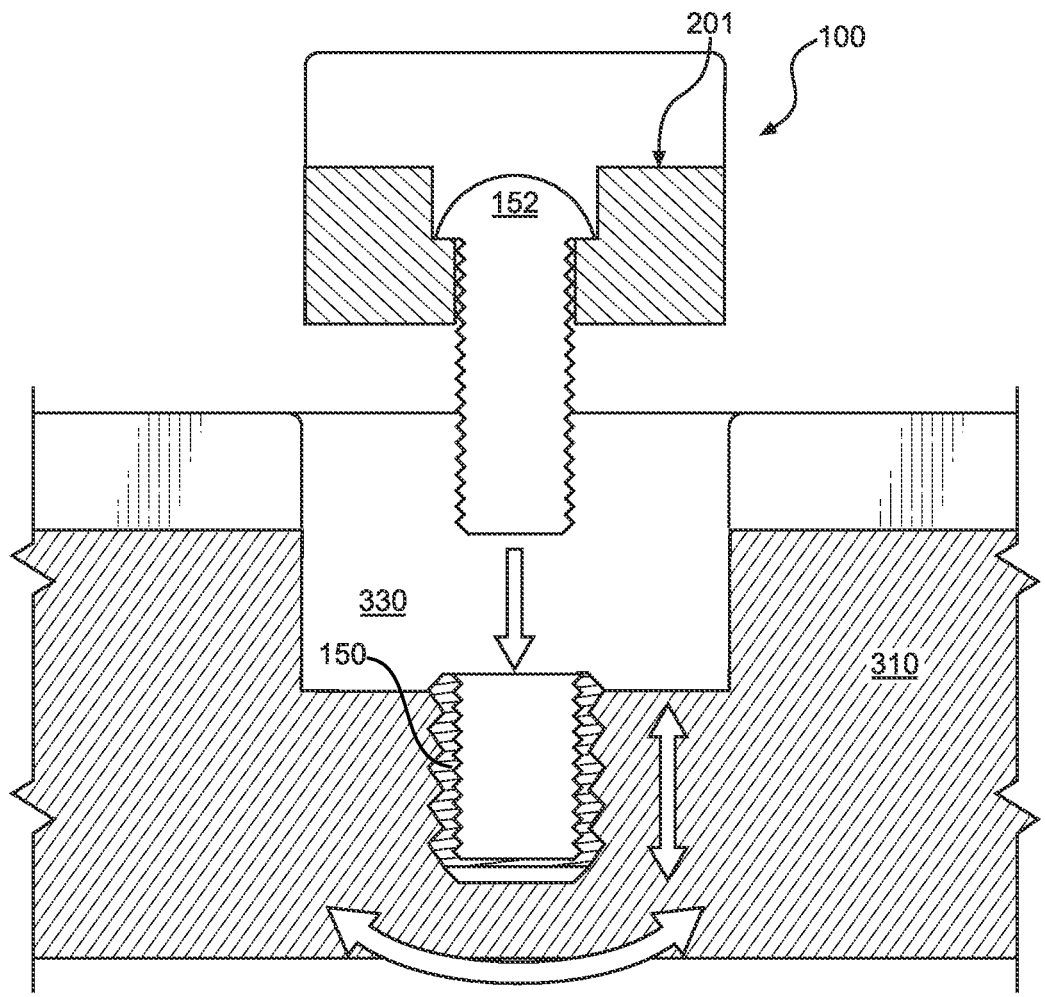
Figure 7:
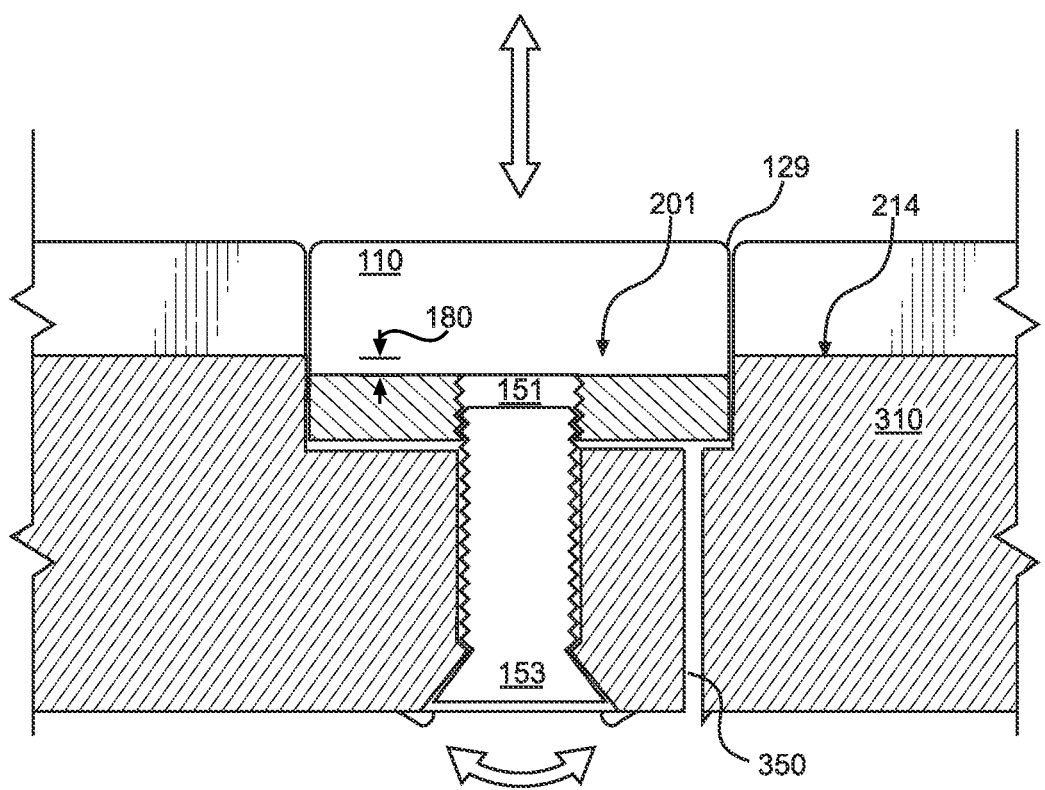

FIGS. 5, 6, and 7 illustrate the interchangeability of a spear retention block within a mortise of a speargun stock, and depicting various configurations of threaded engagement and height adjustment. With respect to FIG. 5, a longitudinal side view depicts a retention block threadedly retained within a mortise of gunstock 310. Threaded fastener 152 threadedly engages a corresponding double-threaded fastener 150. Double threaded fastener provides for elevational adjustment of the top surface of the fastener to provide adjustment of the bottom portion of the retention cavity 201 so as to sit below the bottom portion of spear track 214. Overall length of the retention block 101 is defined by the length of the block from front to back. At the front-top and rear-top of the retention jaws is a curved area 129 to reduce snagging of gear and unwanted sharp points. The inner edges of the mortise may also be correspondingly rounded to produce any sharp angles.

FIG. 6 illustrates a longitudinal cutaway view of retention block 100 removed from mortise 330, and further depicting the elevational adjustment of the retention block accomplished by the combined threaded displacement of double-threaded fastener 150 prior to securing the retention block within the mortise tight to double threaded fastener 150 via retention block threaded fastener 152.

FIG. 7 illustrates an alternative threaded engagement between a retention block and speargun stock 310 through a longitudinal side cutaway view. Threaded fastener 153 operatively engages an internally-threaded portion 151 of the retention block. Fastener 153 is rotationally constrained within stock 310 such that rotating fastener threadedly translates the retention block into the mortise, allowing precise adjustment of block-track gap 180 defined by the elevational difference between track bottom 214 and retention cavity bottom 201. We pull 350 is provided at the bottom of the mortise through stock 310 to a bottom side of the stock allowing drainage of fluids from within the mortise.

Figure 8:
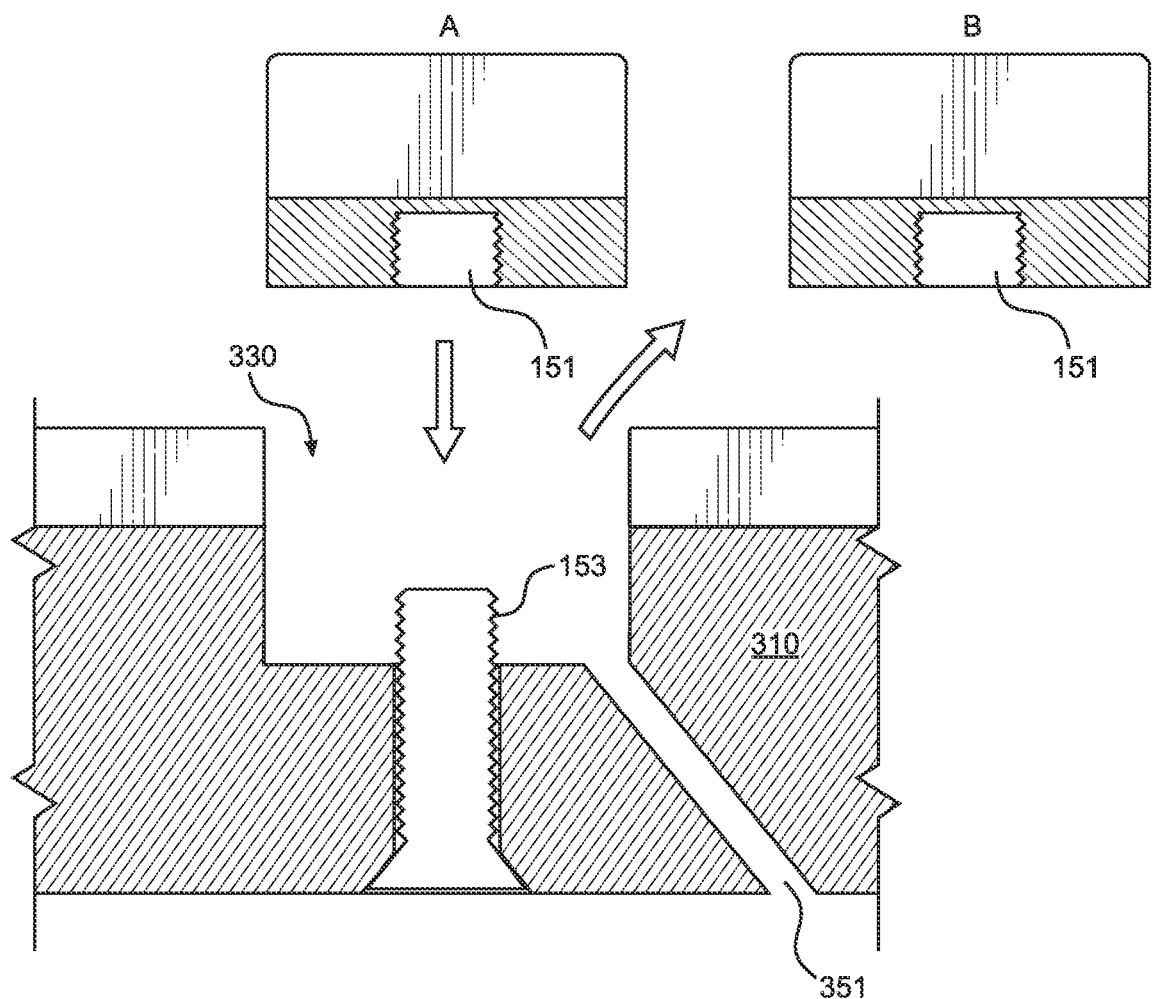
FIG. 8 depicts a side cutaway view of the interchangeability of two retention blocks having differently-sized retention cavities for a given single mortise within a speargun stock.

FIG. 8 illustrates the interchangeability of the retention blocks within a single speargun mortise 330. Retention block A may be sized to accommodate a 5/16 inch diameter spear, while retention block B may be sized to accommodate a 9/32 inch diameter spear. Both retention blocks have an internally threaded portion 151 which threadedly translates the retention block into the mortise 330 through cooperative interaction with rotationally constrained fastener 153. In this particular embodiment, a rearwardly-slanted weep hole 351 is shown extending from a rear bottom portion of the mortise and exiting on an opposite side of stock 310.

Figure 9:
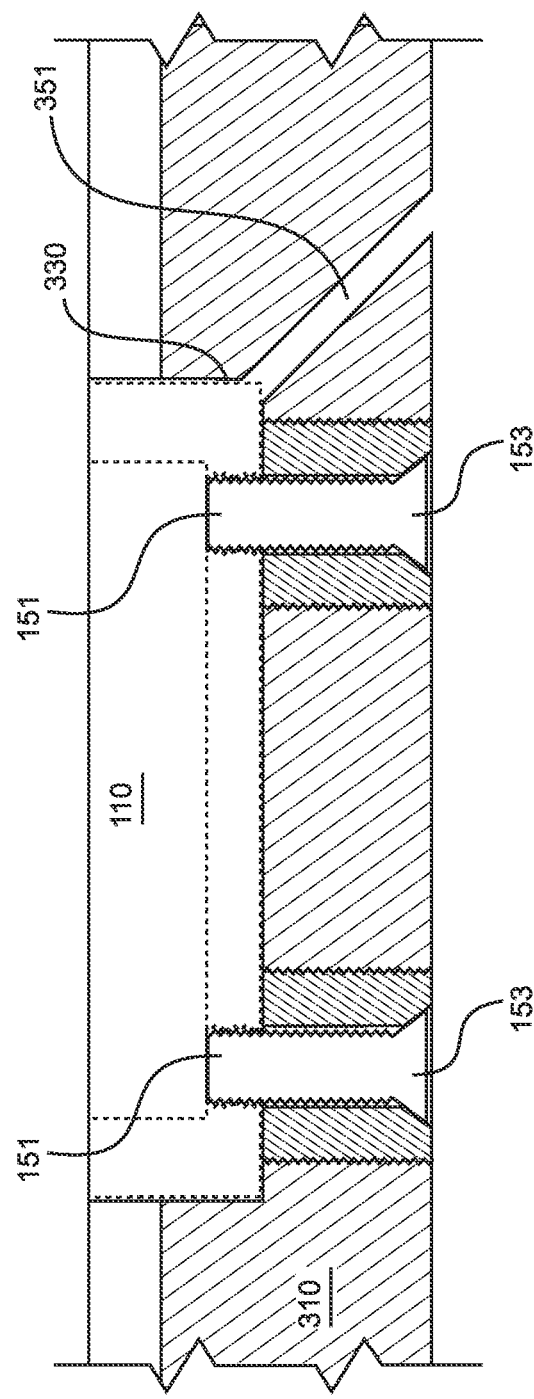
FIG. 9 shows a further embodiment of a spear retention block engaged within a mortise of a speargun stock with a double-threaded height adjustment system.

FIG. 9 Illustrates a side cutaway view of a further embodiment of a retention block in which constrained fasteners 153 operatively interact with corresponding internally-threaded portions 151 in retention block body 110.

Figure 10:
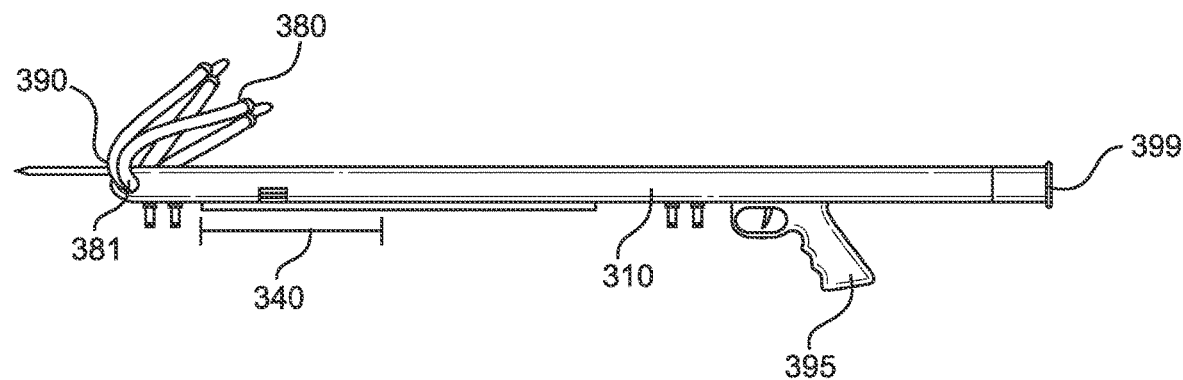
FIG. 10 illustrates a side view of a speargun and depicts an embodiment of the mortise area within a speargun stock.
Figure 11:
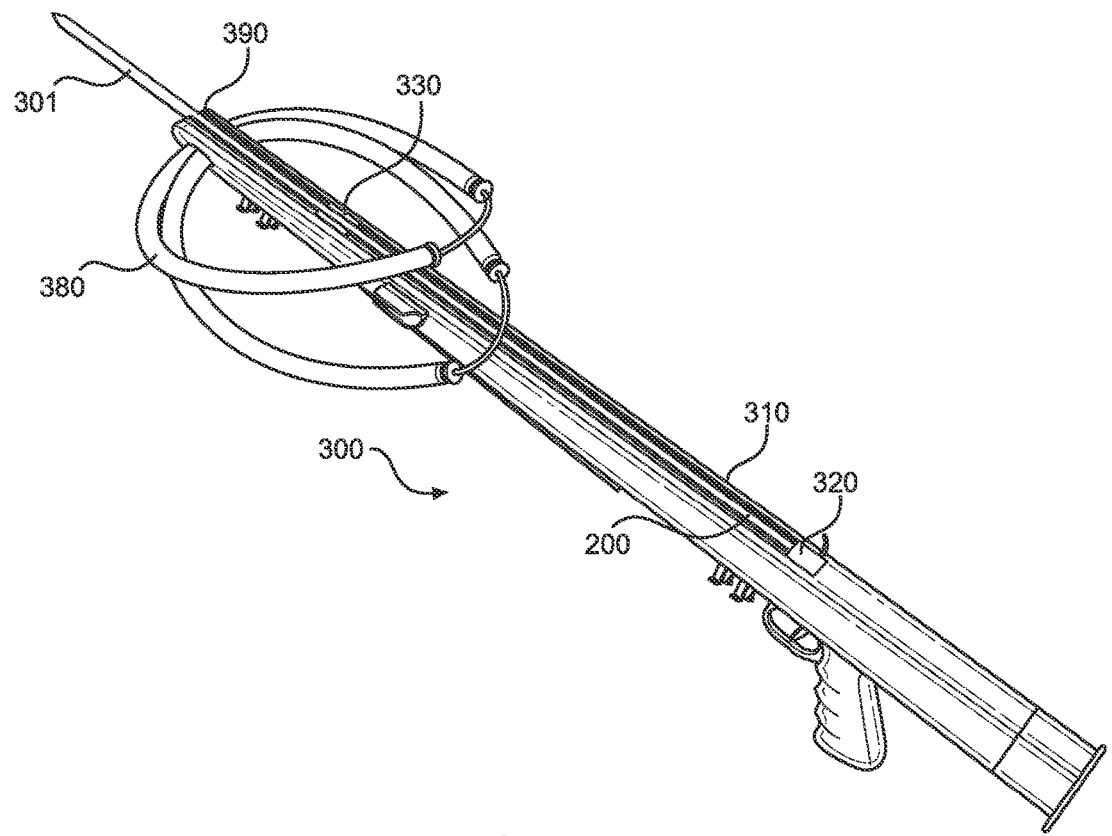
FIG. 11 illustrates a perspective view of an embodiment of a rear-loading sighted speargun in according with the present disclosure.

FIGS. 10 and 11 illustrate yet another embodiment in accordance with the present disclosure in which a rear-loading sighted speargun is depicted. FIG. 10 shows a side view of the rear-loading speargun in which a spear is inserted into the gun and protruding from muzzle end 390. Moving rearward towards grip 395 and butt end 399, power band 380 is shown, attached to stock 310 at attachment point 381. In one embodiment, mortise area 340 is provided on an area of stock 310 rearward of attachment point 381. FIG. 11 shows a predominantly top perspective view of a rear-loading sighted speargun 300 in accordance with the present disclosure. Spear 301 is provided in a photoluminescent track 200 atop stock 310, running from trigger mechanism 320 forward towards mortise 330, and then continuing forward from the mortise past power band attachment point and to the muzzle end 390. In this embodiment, the photoluminescent spear track consists of a shorter forward portion provided between the muzzle end and the mortise, and a longer rearward portion from the mortise to the trigger mechanism.

Figure 12:
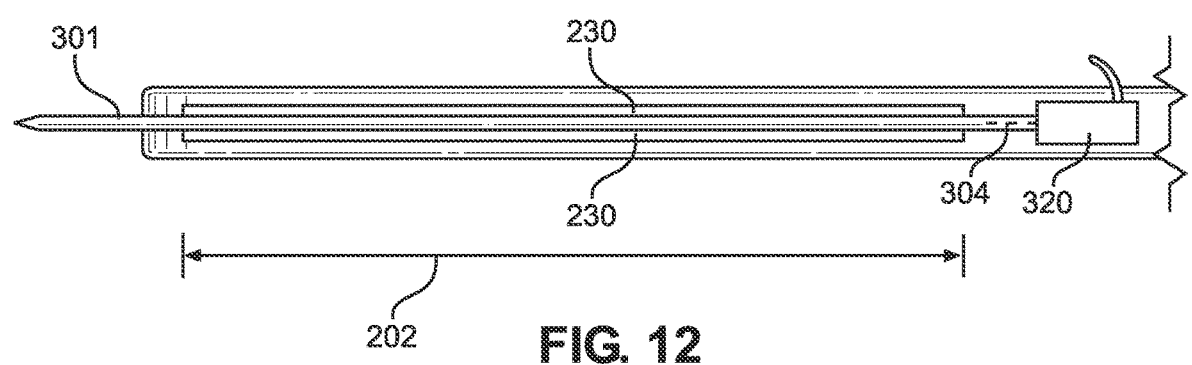
FIG. 12 illustrates a speargun sight along the top portion of a speargun stock with loaded spear.

FIG. 12 illustrates a top view of a portion of a photoluminescent sighted speargun. Track sighting portions 230 remain visible to a user even while spear 301 is loaded into the speargun, with shark fin tabs 304 provided proximate to trigger mechanism 320. The power bands are not depicted to illustrate the full sight length 202 running a distance between the muzzle end and the trigger mechanism.

Figure 13:
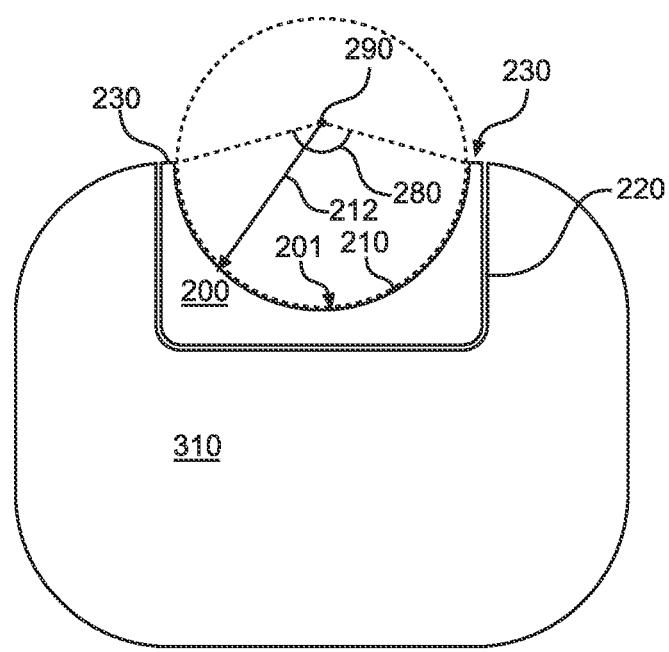
FIGS. 13 and 14 illustrate a side cutaway view of an embodiment of a photoluminescent speargun sight.
Figure 14:
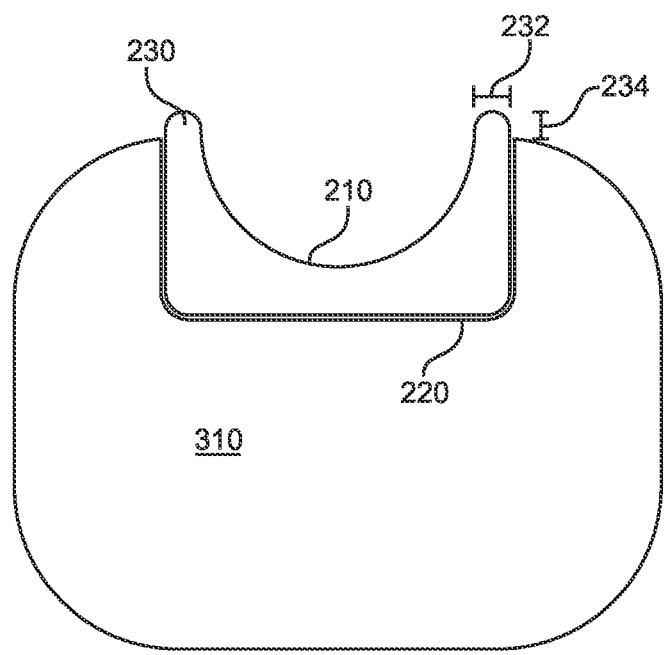

Turning now to FIGS. 13 and 14, which illustrate a side cutaway view of photoluminescent track 200 embedded within speargun stock 310. With reference to FIG. 13, one embodiment of a photoluminescent speargun track is illustrated in accordance with the present disclosure in which sighting portions 230 are approximately level with stock 310. Inner track profile 210 may be approximately semicircular (or elliptical or irregular, not shown) with central sight axis 290 defined by track inner profile radius 212. Central arc angle 280 may further define the length of inner track profile 210. Track inner profile bottom 201 is provided at the relative nadir of track inner profile 210. Track outer profile 220 defines the outer boundary of an approximately concave cylindrical arc, though track outer profile 220 need not be exactly arcuate. FIG. 14 illustrates another cutaway view of an embodiment of a speargun sight in which photoluminescent track 200 is embedded within speargun stock 310. Sighting portions 320 are provided in elevational distance 234 above stock 310, and together with sight width 232 provide greater field of view of the sight from multiple angles. In this particular embodiment, track outer profile 220 is angular, though the overall shape of track 200 may nevertheless be described as a concave cylindrical arc.

As referenced in this disclosure and claims, "a spear" is not to be construed as a structural limitation, but is instead descriptive of the projectile fired from the gun disclosed.

In light of the foregoing description, it should be recognized that embodiments in accordance with the present disclosure can be realized in numerous configurations contemplated to be within the scope and spirit of the claims. Additionally, the description above is intended by way of example only and is not intended to limit the present disclosure in any way, except as set forth in the claims.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

What is claimed:

1. A spear retention block comprising:
a block body having a spear-retaining cavity, the retaining cavity defining a central axis;
two retention jaws extending outward and away from the retaining cavity and longitudinally parallel to the central axis;
an aperture disposed on a bottom surface of the block body;
a threaded fastener dimensioned to fit through the aperture and constrain the block body; and
a double-threaded fastener having a first threaded portion and a second threaded portion, the first threaded portion adapted to threadedly engage with the threaded fastener, the second threaded portion adapted to threadedly engage with a mortise in a spear gun stock, whereby the retention block is constrained within the mortise and selectively displaced relative to the spear gun stock.

2. The spear retention block of claim 1 wherein the retention jaws are provided of a deformable material.

3. The spear retention block of claim 1 wherein the retaining cavity is substantially an arc greater than 180 degrees but less than about 247 degrees, the arc being concentric to the central axis.

4. The spear retention block of claim 3 wherein the radius of the arc is about 0.016 inches greater than the radius of a spear shaft.

5. The spear retention block of claim 1 wherein the aperture extends inward into the block body orthogonal to the central axis.

6. The spear retention block of claim 1 wherein the central axis defines a block length, the block length being between 0.5 inches and 2.0 inches.

7. The spear retention block of claim 1 wherein the retention jaws define a throat, the throat and the top of the retention jaws having a rounded profile.

8. The spear retention block of claim 1 wherein each retention jaw has a first end and a second end, each end having a curved portion.

9. A speargun sighting device comprising:
a photoluminescent concave cylinder defined by
an inner arc having a central axis and dimensioned to slidingly accept a spear shaft, the spear shaft having a spear axis substantially co-axial to the central axis;
an outer profile; and
sighting portions parallel to the central axis and connecting the inner arc and outer profile
wherein the photoluminescent concave cylinder constitutes a spear track provided along a top surface of a speargun stock.

10. The speargun sighting device of claim 9 wherein the sighting portions are substantially level with the top surface of the stock and run substantially from the muzzle end of the speargun stock to the rear of the speargun stock.

11. The speargun sighting device of claim 9 wherein the outer profile comprises a second arc, concentric with the inner arc.

12. The speargun sighting device of claim 9 wherein the width of each of the two sighting portions is between about 0.03 inches and about 1.5 inches, and the sight length is at least 3 inches.

13. A speargun comprising:
a stock having a mortise and a captured threaded fastener;
a concave cylindrical arc defining a spear track along the stock; and
an interchangeable speargun retention block dimensioned to translate into the mortise and having a threaded portion adapted to threadedly engage with the captured threaded fastener,
wherein the captured threaded fastener engages with and displaces the retention block relative to the spear track.

14. The speargun of claim 13 wherein the mortise is located rearward of a power band attachment point, and further comprises a weep hole through the stock.

15. The speargun of claim 13 further comprising a second mortise within the stock, the second mortise dimensioned to reversibly accept a second interchangeable speargun retention block.

16. The speargun of claim 13 further comprising a second retention block, wherein the stock, the retention block, the mortise, and the second retention block define an interchangeable speargun retention system.

17. The speargun of claim 13 wherein the spear track is photoluminescent.

* * * * *